(12) United States Patent
Dawson et al.

(10) Patent No.: US 7,966,249 B1
(45) Date of Patent: Jun. 21, 2011

(54) BLOCK TRADING SYSTEM AND METHOD

(75) Inventors: James D. Dawson, London (GB); R. Raymond May, London (GB); Gregory Hedger, London (GB)

(73) Assignee: ICAP Services North America LLC, Jersey City, NJ (US)

( * ) Notice: Subject to any disclaimer, the term of this patent is extended or adjusted under 35 U.S.C. 154(b) by 422 days.

(21) Appl. No.: 11/705,347

(22) Filed: Feb. 12, 2007

Related U.S. Application Data

(60) Provisional application No. 60/772,066, filed on Feb. 10, 2006.

(51) Int. Cl.
*G06Q 40/00* (2006.01)
(52) U.S. Cl. .......... 705/37; 705/36 R; 705/26.3; 705/35; 705/1
(58) Field of Classification Search .................... 705/35, 705/37, 1, 26.3, 36 R
See application file for complete search history.

(56) References Cited

U.S. PATENT DOCUMENTS

| | | | | |
|---|---|---|---|---|
| 6,029,146 | A * | 2/2000 | Hawkins et al. | 705/35 |
| 7,246,093 | B1 * | 7/2007 | Katz | 705/37 |
| 7,330,831 | B2 * | 2/2008 | Biondi et al. | 705/36 T |
| 2003/0216932 | A1 * | 11/2003 | Foley | 705/1 |
| 2004/0172337 | A1 * | 9/2004 | Spoonhower et al. | 705/26 |
| 2005/0246257 | A1 * | 11/2005 | Zhang | 705/35 |
| 2006/0026090 | A1 * | 2/2006 | Balabon | 705/37 |

* cited by examiner

*Primary Examiner* — Harish T Dass
(74) *Attorney, Agent, or Firm* — Dickstein Shapiro LLP

(57) ABSTRACT

In an electronic trading system, a method for facilitating block trading of financial instruments includes establishing a set of tiered block trading ranges, each tiered block trading range having a lower limit defining a minimum order size for filling block trades within the respective tiered block trading range, receiving a block order for a financial instrument, the block order having a block size that falls within a first tiered block trading range, and executing the block order in accordance with the minimum order size defined by the lower limit associated with the first tiered block trading range. The electronic trading system is adapted to identify executed trades with matching parties and financial instruments, combine each set of matching trades into a single trading order, reverse out the individual matching trades, execute the single trading orders, and transmit data corresponding to the executed trades to the transacting parties or a clearing entity.

35 Claims, 7 Drawing Sheets

BLOCK TRADING SYSTEM AND METHOD

CROSS REFERENCE TO RELATED APPLICATION

The present application claims the benefit of U.S. Provisional Patent Application Ser. No. 60/772,066, filed Feb. 10, 2006, which is incorporated herein by reference.

FIELD OF THE INVENTION

The present invention relates generally to electronic trading in financial markets and, more particularly, to electronic trading systems and methods that facilitate block trading of derivative instruments.

BACKGROUND OF THE INVENTION

Electronic trading systems provide computer-based platforms for matching buyers and sellers of financial instruments. In recent years, the use of electronic trading systems has revolutionized the industry as traders have increasingly favored electronic trading over traditional trading methods. Electronic trading systems offer many advantages including reduced transaction costs, increased accuracy, expanded trading hours and the wide dissemination of real time market information.

Electronic trading systems are now common in most financial markets. In the equities market, for example, NASDAQ uses an order entry and execution system known as SuperMontage for all securities transactions. In the Foreign Exchange market, Reuters and EBS operate online trading systems. BrokerTec and eSpeed have developed electronic trading systems for the inter-dealer bond market.

Many electronic trading systems receive buy and sell orders from traders and immediately publish the order information to each trader in an order book. This fast dissemination of information poses problems, however, when block trades (trades having a relatively large order size) are involved. For example, when large block orders appear on the exchange's order book, it is common for other traders to respond by taking actions that lead to adverse price movements for the block trader. Many of the difficulties associated with electronic block trading systems are explained in U.S. Patent Publication No. 2004/0059666, published Mar. 25, 2004, and incorporated herein by reference.

One solution to the information dissemination problem is to segment the block order into smaller portions for trading as individual units. Often, only one segment is displayed in the order book at a time, allowing sequential execution of the block order segments without disclosing the block order to other traders. Although other traders will only see the small orders, savvy traders may be able to identify an attempt to execute a large block order in segments, particularly when the segments are relatively large.

Another approach is an "All or None" (AON) order, which is either filled in its entirety or not at all. If an AON order is immediately displayed, the market may be driven away from the AON trader. In another approach, an AON order is not displayed on the order book until enough shares are available to fill the order. When enough shares are available, the AON order is added to the book and the order is executed. In this manner, information regarding a pending AON block order is not disseminated to other traders. One drawback of an AON order is that the order may not get executed while smaller orders continue trading.

In derivatives markets, additional issues arise including the transactional costs of processing trades and a general lack of liquidity for certain derivatives. Unlike securities, over-the counter (OTC) derivatives are bi-lateral contracts which are nonfungible and have significant processing costs associated with each transaction. For example, each option contract owned by a trader will expire unless exercised by the maturity date. The trader is responsible for monitoring the status of the option, deciding whether to exercise the option and taking the necessary steps to exercise the option if desired. As a result, a trader of derivatives typically prefers to execute a small number of large trades, as opposed to numerous smaller trades, to reduce the ongoing processing costs. Electronic trading, however, has led to a decrease in the average trade size as compared to traditional approaches, leading to potentially higher processing and transaction costs.

The traders that bring large block orders to the market seldom want their orders to be filled through a series of very small transactions and generally prefer to maintain their block orders in confidence to avoid price manipulation by other traders. In view of the above, there is a need for a block trading system and method for derivatives and other financial instruments that protects confidentiality of large block orders, provides efficient trading of block orders and reduces associated transaction costs. It is desirable that such a system would, at the same time, support traders that bring smaller volume orders to the same order book.

SUMMARY OF THE INVENTION

The present invention is an electronic trading system and method for facilitating block trading of financial instruments such as derivatives. In one aspect of the present invention, a block trading method includes establishing a plurality of tiered block trading ranges, each tiered block trading range having a lower limit and a minimum order size for filling block trades within the respective tiered block trading range, receiving a first block order for a financial instrument, the first block order having a block size within a first tiered block trading range, and executing the first block order in accordance with the respective minimum order size associated with the first tiered block trading range.

In another aspect of the present invention, the block trading method further includes receiving a plurality of block orders for the financial instrument, the block orders having a first-in, first-out execution priority. The associated block orders within each tiered trading range are executed in accordance with the execution priority. In this manner, a block order received after a higher priority block order will be executed prior to the higher priority block if it has priority within its tiered trading range.

In an alternative aspect of the present invention, the block trading method further includes receiving a plurality of block orders for the financial instrument, the block orders having a first-in, first-out execution priority. The associated block orders are executed in accordance with the execution priority, such that at least one lower priority block order steps around a higher priority block order based on block order size.

In another aspect of the present invention, the electronic trading system is adapted to identify executed trades with matching parties and financial instruments, combine each set of matching trades into a single trading order, reverse out the individual matching trades, execute the single aggregate trading order for each set of matching trades, and transmit data corresponding to the executed trades to the transacting parties or a clearing entity.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
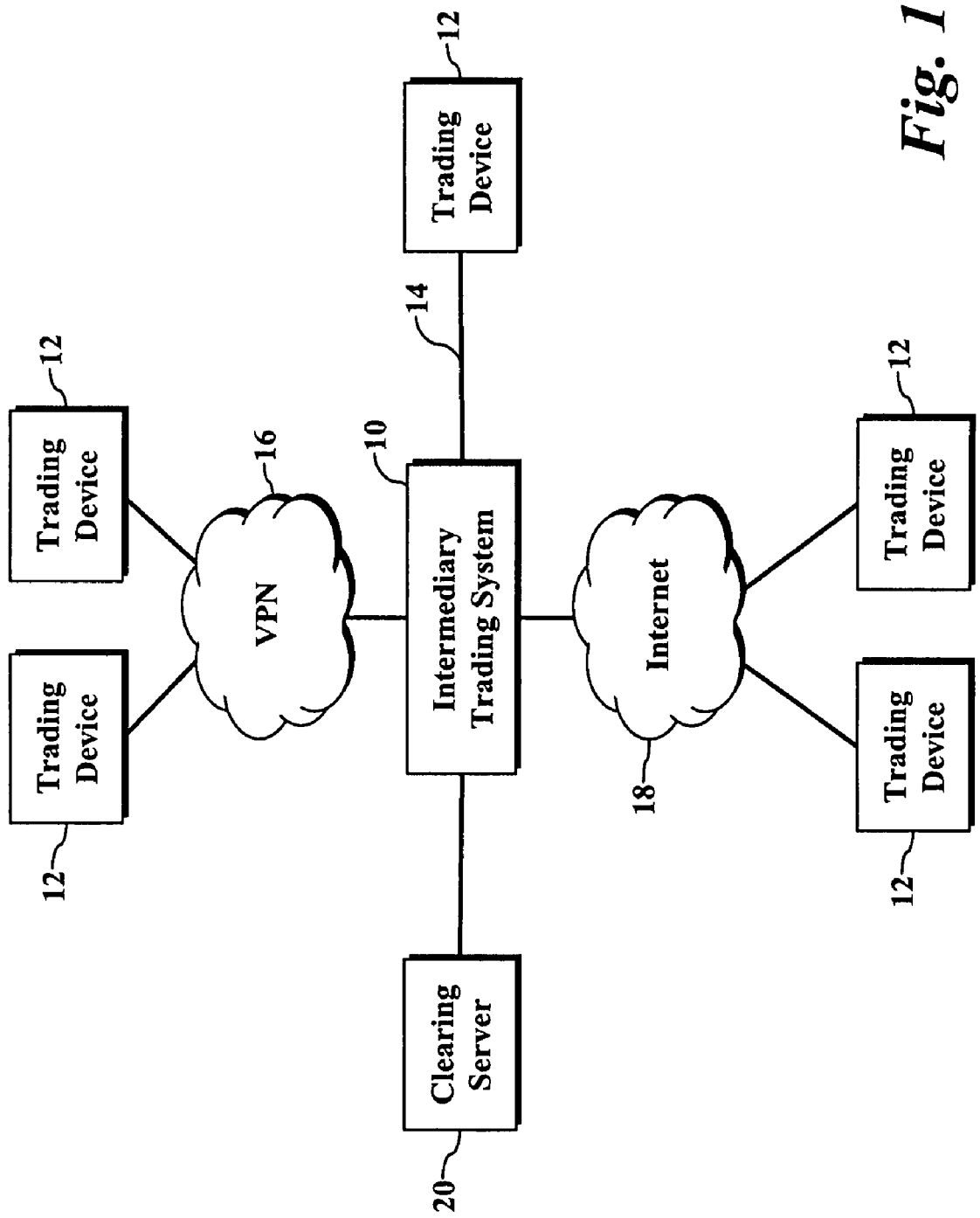
FIG. 1 is a block diagram illustrating an embodiment of an electronic trading system.

An exemplary embodiment of the present invention will now be described with reference to FIG. 1. An intermediary trading system 10 is adapted to communicate with a plurality of trading devices 12, such as through a private line 14, virtual private network 16, and the Internet 18. The intermediary trading system 10 may include one or more conventional computer systems including a microprocessor, a memory, a data storage device and a communications device. Each trading device 12 may be any device adapted to communicate with the intermediary trading system 10, such as a personal computer, personal digital assistant (PDA) or other network device. In operation, each trading device 12 may be associated with a person or entity (e.g., a broker-dealer or asset manager) authorized to trade financial instruments through the intermediary trading system 10. A clearing server 20 is adapted to receive order execution information from the intermediary trading system 10 and facilitate funds transfers between traders.

Figure 2:
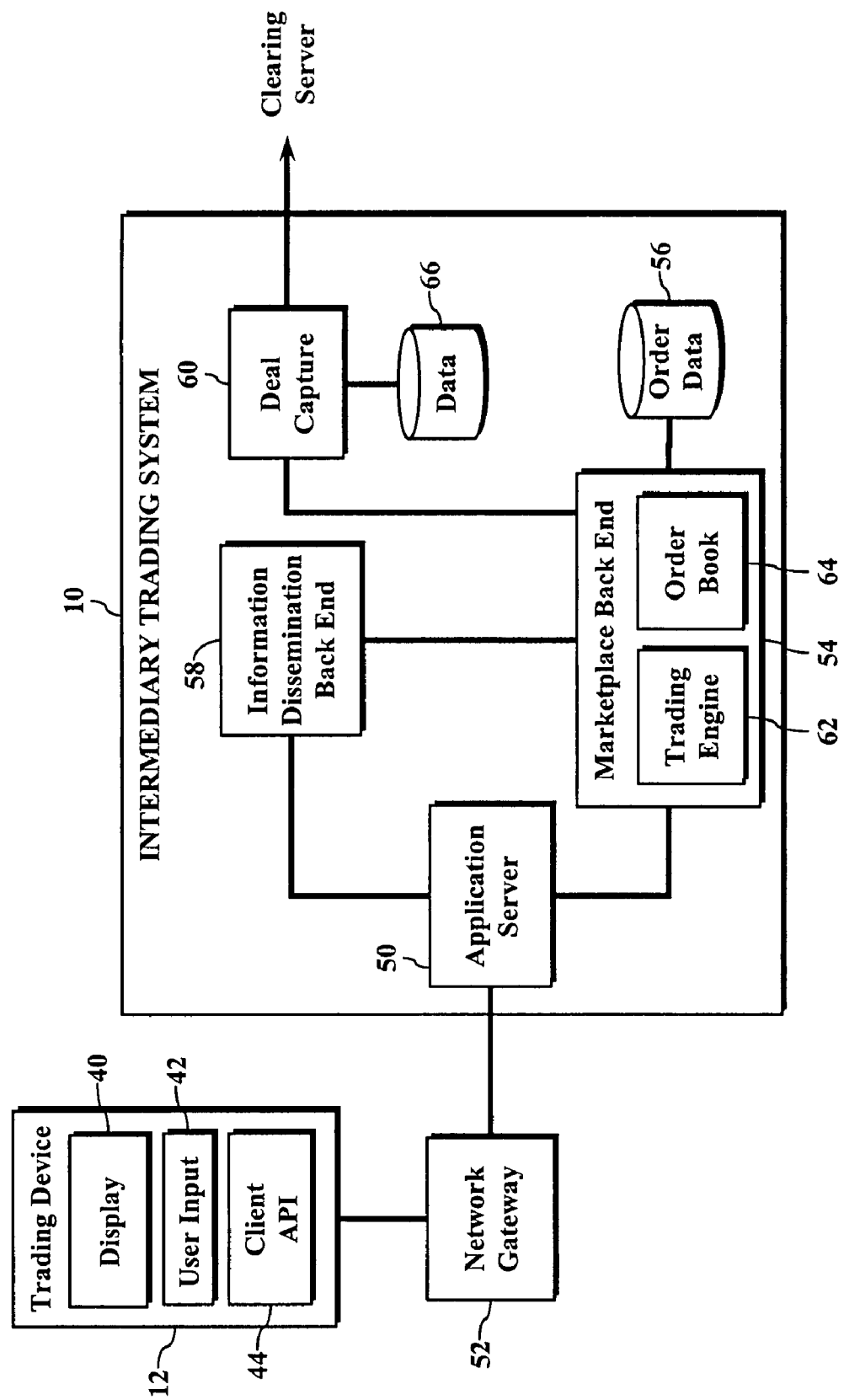
FIG. 2 is a block diagram illustrating an embodiment of the intermediary trading system and trading terminal of FIG. 1.

Referring to FIG. 2, each trading device 12 includes a display 40, a user input device 42 and program logic 44. In one embodiment, the program logic is implemented as a client application program interface (API) 44 that facilitates a graphical user interface (GUI) through which a trader interfaces with the intermediary trading system 10. The API 44 further facilitates the retrieval and display of financial instrument prices, order origination and tracking, and other functions as described herein.

The intermediary trading system 10 includes an application server 50 adapted to communicate with the trading device 12 through a network gateway 52. In one embodiment, the application server 50 is a web server and the GUI on the trading device 12 includes a web browser interface. A marketplace back end 54 receives order data from trading device 12 and stores the data in an electronic storage medium 56. In the exemplary embodiment, the marketplace back end 54 includes a trading engine module 62 adapted to execute trades and an order book module 64 adapted to maintain an order book for dissemination to the trading device 12. An information dissemination back end 58 disseminates trading information to the trading device 12. A deal capture module 60 collects and stores in electronic storage medium 66 all transactions executed on the intermediary system 10 and forwards the transaction data to the clearing server.

In operation, a trader enters an order into a graphical order form on the trading device 12 which forwards the order to the intermediary trading system 10. The order book module 64 adds the order to the order book and transmits the current order book to the trading device 12. If the order can be filled, the trading engine 62 executes the order and forwards the trade execution data to the deal capture module 60. After a trade is executed, the order is removed from the current order book and the intermediary server notifies the trading device 12. After the trade is completed and has been properly documented, clearing is handled by the clearing institution 20. The clearing institution 20 verifies the accuracy of each trade, notifies each trader of its obligations and arranges for the transfer of appropriate funds and financial instruments.

Figures 3, 4:
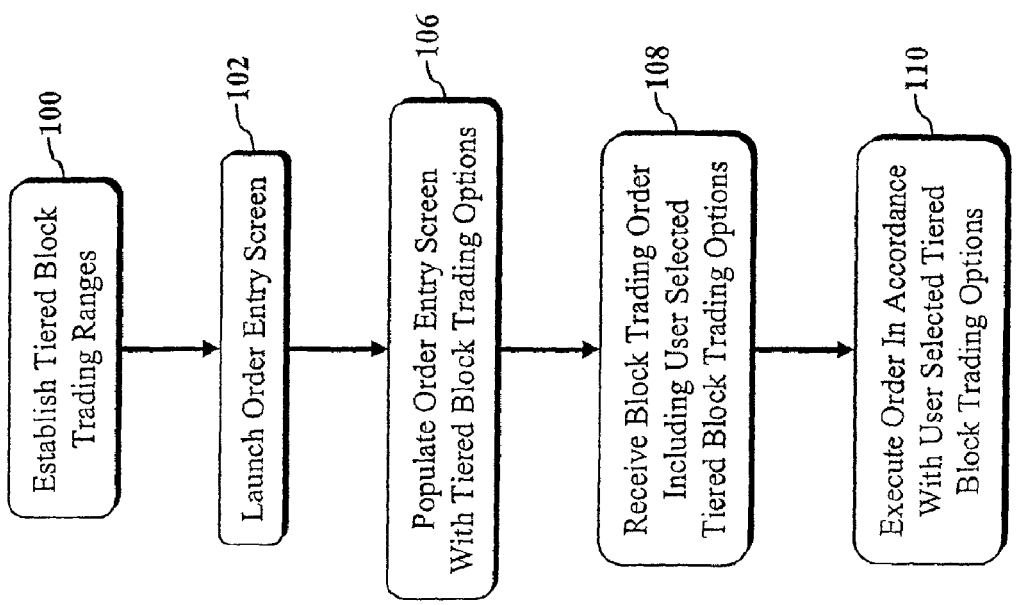
FIG. 3 is a flow chart illustrating an embodiment of a method for block trading using tiered block trading ranges.
FIG. 4 is an exemplary table illustrating three tiered block trading ranges.

Referring to FIG. 3, an embodiment for facilitating block trades for financial instruments will be described. As used herein, financial instruments may include, without limitation, stocks, bonds, futures and derivatives. In step 100, the intermediary trading system 10 establishes tiered trading ranges for block trades. In one embodiment, three tiers are defined. Each tier has a lower volume limit for block orders. Each tier also specifies a minimum trade size for filling the block orders falling within that tier, against counter orders. In one embodiment, the minimum trade size for filling the block orders in a tier may be the value representing the bottom of the volume range, that is to say, the lower volume limit itself. In another embodiment, the minimum trade size for filling the block orders in a tier may be lower than the lower volume limit. For example a tier defined by volume ranges from 1 to 5 million (i.e., in which the lower volume limit is 1 million) could have an associated minimum trade size of 500,000.

Referring to FIG. 4, an exemplary table 114 illustrates the tiers of the present embodiment. Without the tiered system, the exchange's minimum trade size applies which may result in a small average trade size for executing block trades and consequently higher processing and transactions costs to the trader. It will be appreciated that the tiered block trading ranges of the present embodiment are exemplary and that more than three tiered block trading ranges may be used and other lower limits may be set for each tier.

In FIG. 4, the lower volume limit and the minimum trade size are the same for each tier. Applying the tiers to a block order, no trade can be executed on a block order below the lower volume limit associated with the lowest tier, tier T1. In addition, block orders falling within one of the tiers T1, T2 or T3 cannot be executed through trades having order sizes that are less than the corresponding minimum trade size of the respective tier, which in this case is equal to the lower volume limit of the respective tier: block orders falling within tier T1 can trade in 1 million contract increments or greater; block orders falling within tier T2 can trade in 5 million contract increments or greater; and block orders falling within tier T3 can trade in 25 million contract increments or greater. For example, if a block order of 20 million contracts falls within tier T2, the block order will not be filled through a trade size including 1 million contracts, and a block order of 150 million contracts falling within tier T3 will only be traded in amounts of 25 million or more.

In one embodiment, the tiers are set manually through the intermediary trading system 10 and stored at the intermediary trading system 10. In another embodiment, separate tiered block trading ranges may be established for individual financial instruments based on a statistical analysis of the financial instrument and the trading history of the financial instrument in the market including factors such as average trade size, transaction costs and liquidity. The tiered ranges and associated minimum trading sizes are preferably selected to provide a balance between facilitating order fulfillment and minimizing transaction costs.

Figure 5:
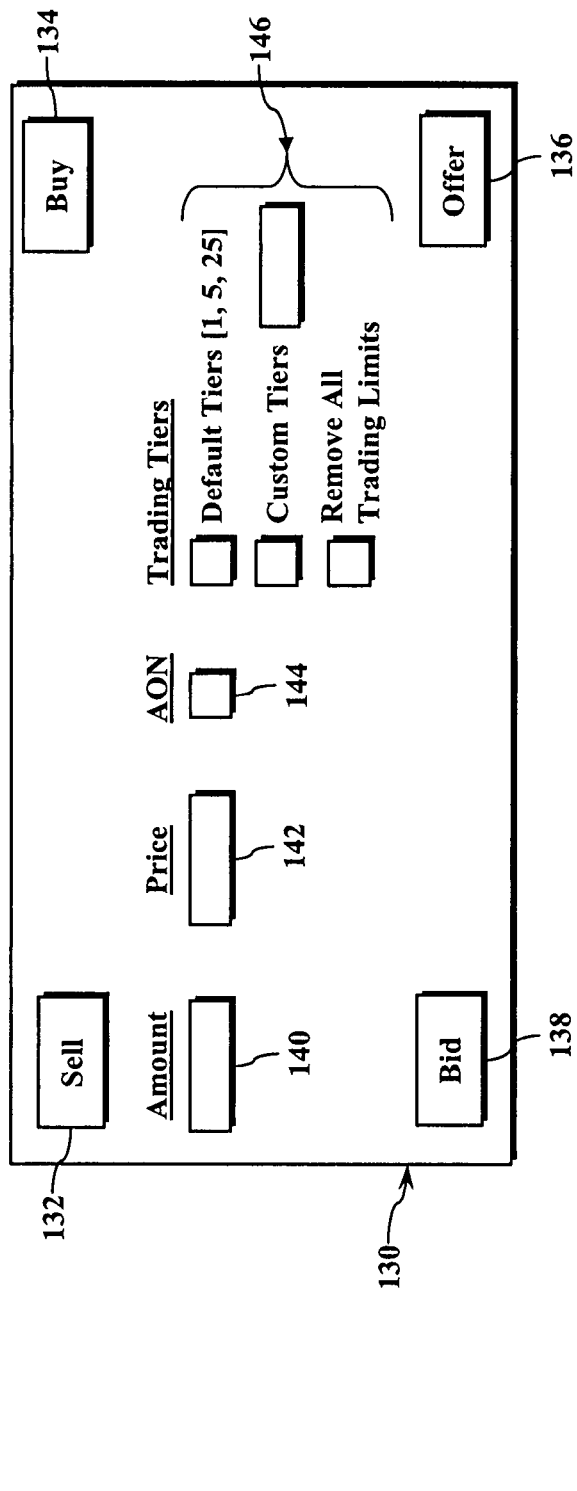
FIG. 5 illustrates a trading screen in accordance with an embodiment of the present invention.

Referring back to FIG. 3, in step 102 an order entry screen is launched at the trading device 12. An exemplary order entry screen 116 is illustrated in FIG. 5. Through the order entry screen, the trader is provided with a view of pending orders 120 including quantities 122 and prices 124 of pending purchase orders and quantities 128 and prices 126 of financial instruments offered for sale. The trader may enter order information into an order entry window 130, including a quantity 140 of financial instruments to be traded, a price 142 for the order, and whether the order is an all-or-none order 144. The order entry window 130 includes action buttons allowing the trader to buy 134, sell 132, offer 136 or bid 138 the displayed order. The order entry window 130 is populated with available tiered block trading options in step 106. In the exemplary embodiment, the order entry window 130 displays a plurality of block trading options 146. As illustrated, the trader can instruct the system to execute the order using the default tiers (e.g., the tiers shown in FIG. 4, the first of which has a lower volume limit for block orders and a minimum trade size for trades with counter orders both equal to 1 million, the second of which has a lower volume limit for block orders and a minimum trade size for trades with counter orders both equal to 5 million and the third of which has a lower volume limit for block orders and a minimum trade size for trades with counter orders both equal to 25 million), enter custom tier values and minimum trading sizes for each tier, or remove trading limits altogether.

In step 108, the intermediary trading system 10 receives the order, including the tiered volume trading ranges and minimum order sizes that govern the execution of the order. In step 110, the order is processed in accordance with the received tiered trading ranges and minimum order sizes. In the exemplary embodiment, pending orders 120 are displayed and default tiered trading ranges are presumed for block orders. A code 148 notifies the trader of trades that do not comply with the default tiered trading ranges. In one embodiment, the code 148 may include a number indicating the minimum trade size for filling the order or another symbol identifying other options selected by the trader such as an all-or-none order (e.g., "a") or that all limits have been removed (e.g., "r").

Figures 6, 7A, 7B:
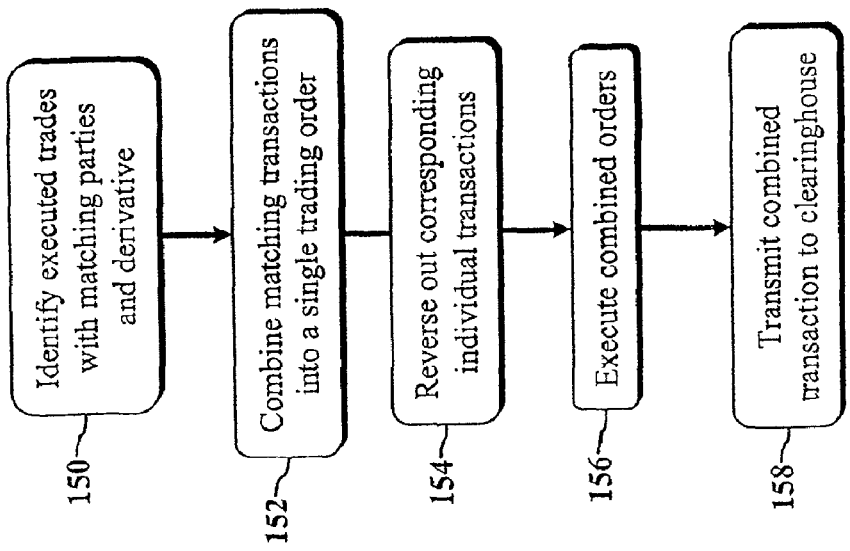
FIG. 6 is a flow chart illustrating an embodiment of a method for reducing transaction costs associated with block trading.
FIGS. 7a-b illustrate exemplary tiered block trading ranges and an associated order book.

Another embodiment for reducing transaction costs is illustrated in FIG. 6. The embodiment of FIG. 6 may be used in place of, or in conjunction with, the tiered block trading ranges described above. Unlike stocks, a derivative is a contract that is ongoing until it is terminated, cancelled or expired. Each contract requires management and, at some point, potentially timely action by one or more of the parties to the contract. To reduce the number of contracts between parties, the intermediary trading system 10 aggregates orders as described in FIG. 6. In step 150, at the end of the trading day the deal capture module 60 (FIG. 2) searches the day's executed trades for transactions involving the same pair of parties and same derivative instrument. In step 152, these transactions are aggregated into a single trading order. In step 154, the plurality of matching orders are reversed out of the system. In step 156, the aggregated single trading orders are executed by the trading engine 62 as individual transactions. In step 158, the executed trades, including the aggregated trades, are transmitted to the clearing server 20. In this manner a trader can buy and sell all day, even in small quantities, and at the end of the day, the intermediary trading system 10 reconciles matching trades as a single transaction between the parties. Execution of the orders as a single derivative contract reduces the processing costs of maintaining the separate derivative contracts from each separate trade.

Referring to FIGS. 7a-b, 8 & 9, an embodiment of order matching logic for a tiered block trading system will now be described. In this embodiment, the trading engine 62 (see FIG. 2) is adapted to execute trades on a first in, first out (FIFO) basis such that orders having the best price are executed in the order received. Conventional prior art trading engines operate on a FIFO basis so that the second to arrive order will not execute until after the prior order is executed. For example, if a small order of 1,000 contracts is received after a larger order of 100,000 contracts, both having the same price, the small order would not be filled until after the larger order. In accordance with the exemplary embodiment, the trading engine 62 is further adapted to fill an aggressive block order by matching the best order in the order book for a tiered block trading range, stepping around orders in other tiers that have FIFO time priority.

For example, referring to FIGS. 7a-b, an aggressive block order having a volume of 10 million falls within the second block trading tier T2 and will be matched with counter orders having a minimum order size of 5 million. If a plausible counter order exists in the order book with volume larger than the minimum trade size, but at lower priority than pending counter orders with volume less than the minimum trade size, the aggressive block order will match against the lower priority counter order. As illustrated in FIG. 7b, an aggressive block order having a volume of 10 million and a bid price of $9 will be matched against the counter order 190 having the highest priority for filling orders within the corresponding tiered trading range. After an aggressive block order is matched against the counter order, the remaining balance of the aggressive block order is filled in the same manner. In one embodiment, if the remaining balance has a volume that is less than the minimum trade size for the trading tier then, depending on user preference, either (i) the trading tier corresponding to the volume of the remaining balance will be applied, or (ii) the remaining balance is removed from the order book without filling the order.

Figure 8:
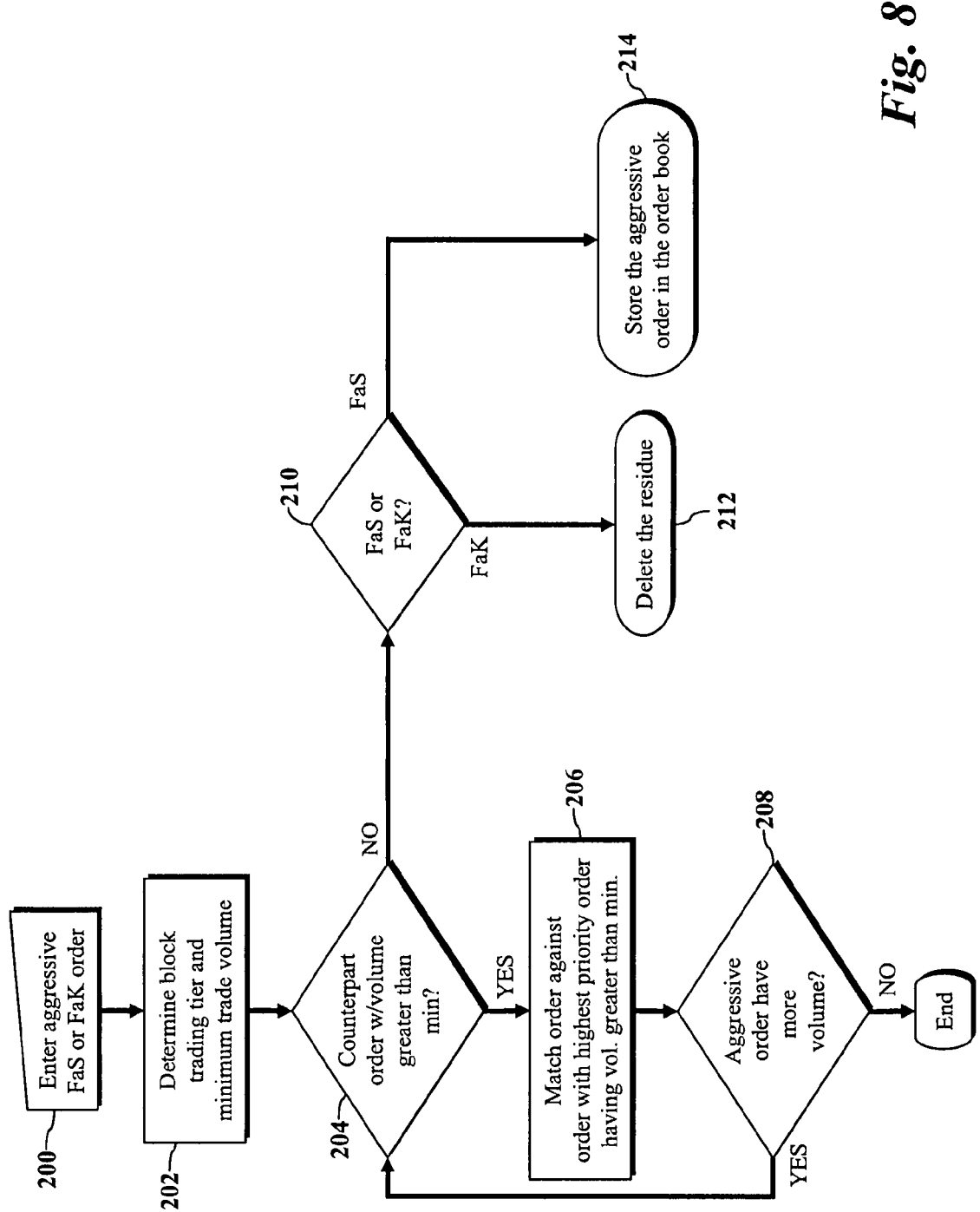
FIG. 8 is a flow chart illustrating and embodiment of order matching logic for filling fill-and-store and fill-and-kill orders.

Referring to FIG. 8, an embodiment of order matching logic for executing "fill and store" and "fill and kill" orders is illustrated. A fill and store (FaS) order is executed by the trading engine 62 to the extent matching orders are found in the order book, with the balance of the order remaining open until the order expires. A fill and kill (FaK) order is executed to the extent matching orders are found in the order book, with the balance of the order to be automatically canceled. In step 200, a FaS or FaK order is received from a trading device. In step 202, the trading engine determines the block trading tier and minimum trading volume to apply to the order. In step 204, the trading engine searches the order book for a counterpart order having a volume greater than the associated minimum trading volume. If at least one counterpart order is found, then in step 206 the order is matched against the counterpart order having the highest priority. In step 208, if the order was only partially filled, then the trading engine attempts to find another counterpart order in step 204. The process continues until the order is filled or no more counterpart orders are found. If the order is only partially filled, then the remainder of the order is either deleted (steps 210 and 212), if the order is a FaK order, or stored in the order book in step 214, if the order is a FaS order.

Figure 9:
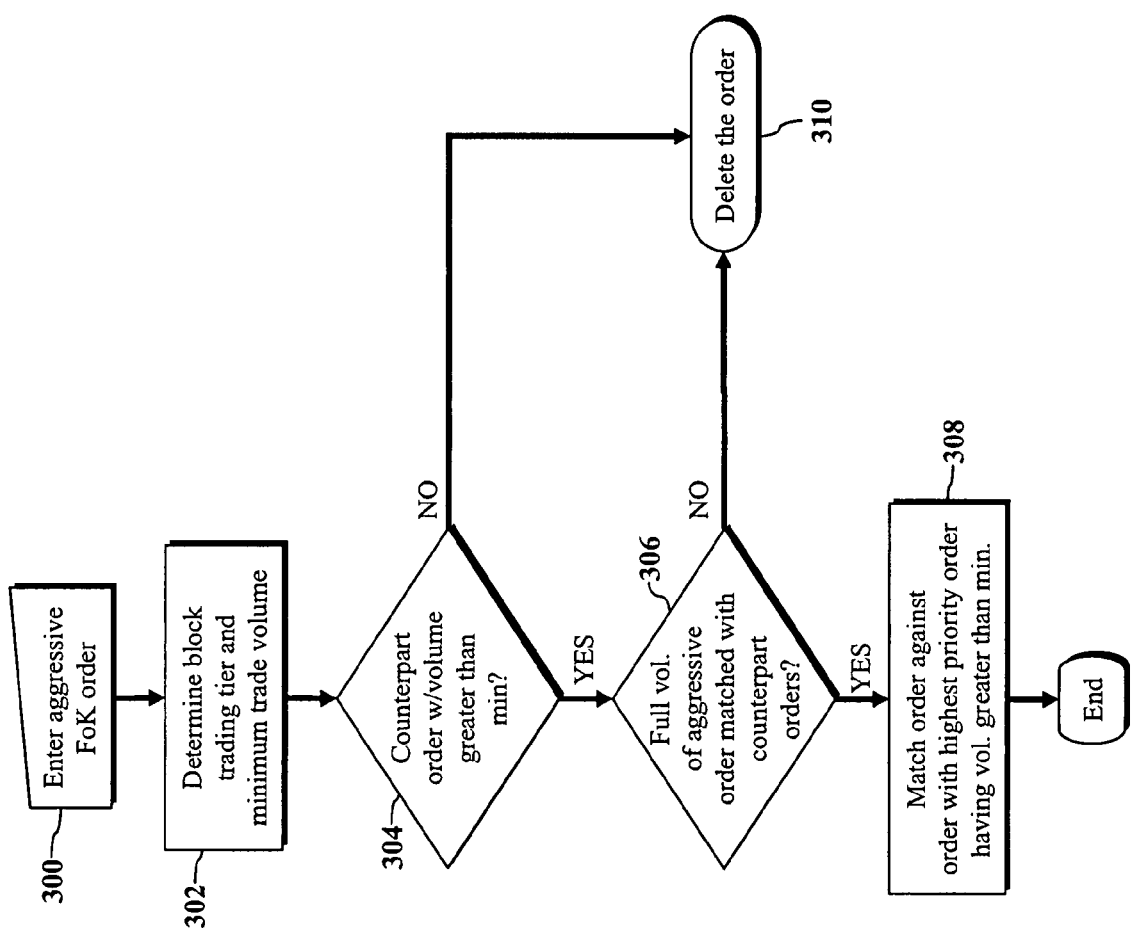
FIG. 9 is a flow chart illustrating an embodiment of order matching logic for filling fill-or-kill orders.

Referring to FIG. 9, an embodiment of order matching logic for executing fill or kill orders is illustrated. In a fill or kill order (FoK), the trading engine 62 attempts to execute the entire order, and if the order cannot be filled in its entirety, the trading engine will delete the FoK order without executing a trade. In step 300, a FoK order is received from a trading device. In step 302, the trading engine determines the block trading tier and minimum trading volume to apply to the order. In step 304, the trading engine searches the order book for a counterpart order having a volume greater than the associated minimum trading volume. If at least one counterpart order is found, then in step 306 the trading engine determines whether the order can be completed in its entirety. If the order can be filled, then in step 308 the trading engine executes the order by matching it with the highest priority counterpart orders having volumes that exceed the minimum trading volume for the range. If insufficient counterpart orders exist to fill the FoK order, then the FoK order is deleted in step 310.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. In an electronic trading system having a server and a trading engine, a method for facilitating block trading of financial instruments comprising:
    establishing at the server a plurality of block trading tiers, each block trading tier having a volume range for block orders within the respective block trading tier, and a minimum order size for counter orders for executing block trades of block orders against the counter orders, within the respective block trading tier;
    receiving, at the server from a trading device which interfaces with the server, a block order for a financial instrument, the block order having a volume size falling within the volume range of one of the block trading tiers;
    executing, at the trading engine, the block order against a counter order to produce a block trade, in accordance with the respective minimum order size associated with the block trading tier in which the block order falls;
    at the server, identifying sets of executed block trades, the executed block trades in a set having matching parties and financial instruments;
    at the server, combining the executed block trades in each set of matching executed block trades into a single trading order;
    at the server, removing the individual executed matching block trades from the system; and
    at the server, executing the single trading order.

2. The method of claim 1 wherein the step of establishing a plurality of block trading tiers for a particular financial instrument comprises selecting a plurality of block trading tiers associated with the financial instrument.

3. The method of claim 2 wherein the step of establishing a plurality of block trading tiers for the particular financial instrument comprises analyzing a trading history of the financial instrument and selecting volume ranges and minimum order sizes for the block trading tiers to reduce transaction costs.

4. The method of claim 1 further comprising:
    transmitting data corresponding to the executed trades to a clearing entity.

5. The method of claim 1 further comprising:
    receiving, at the server from a trading device which interfaces with the server, a plurality of block orders for the financial instrument, the block orders having a first-in, first-out execution priority; and
    within each block trading tier, executing, at the trading engine, the associated block orders in accordance with the execution priority, wherein at least one block order steps around a higher priority block order based on the tiered trading ranges.

6. The method of claim 1 further comprising:
    receiving, at the server from a trading device which interfaces with the server, a plurality of block orders for the financial instrument, the block orders having a first-in, first-out execution priority; and
    executing, at the trading engine, the associated block orders in accordance with the execution priority, wherein at least one block order steps around a higher priority block order based on block order size.

7. The method of claim 1, wherein the volume range for each block trading tier comprises at least one of an upper volume limit and a lower volume limit.

8. In an electronic trading system having a server and a trading engine, a method for reducing transaction costs associated with block trading of financial instruments comprising:
    at the server, identifying sets of executed trades, the executed trades in a set having matching parties and financial instruments;
    at the server, combining the executed trades in each set of matching executed trades into a single trading order;
    at the server, removing each individual executed matching trade; and
    executing the single trading order.

9. The method of claim 8 further comprising the server transmitting data corresponding to the executed trades to a clearing entity.

10. The method of claim 8 further comprising:
    establishing at the server a plurality of block trading tiers, each block trading tier having a volume range for block orders within the respective block trading tier and a minimum order size for counter orders for executing block trades of block orders against the counter orders, within the respective block trading tier;
    receiving, at the server from a trading device which interfaces with the server, a block order for a financial instrument, the block order having a volume size that falls within the volume range of one of the plurality of block trading tiers; and
    executing, at the trading engine, the block order against a counter order in accordance with the respective minimum order size associated with the block trading tier in which the block order falls.

11. The method of claim 10 wherein the step of establishing at the server a plurality of block trading tiers for a particular financial instrument comprises selecting a plurality of block trading tiers that corresponds to the financial instrument.

12. An electronic trading system for facilitating block trading of financial instruments comprising:
a server adapted to interface with a trading device to receive block orders;
a trading engine adapted to execute block orders against counter orders in accordance with at least one set of block trading tiers, each block trading tier specifying a minimum order size for counter orders for executing block trades of block orders against the counter orders within that tier; and
a deal capture module adapted to:
store data associated with executed block trades;
identify sets of executed block trades, the executed block trades in a set having matching parties and financial instruments;
combine the executed block trades in each set of matching executed block trades into a single trading order;
remove the individual executed matching block trades from the system; and
execute the single trading order.

13. The electronic trading system of claim 12 wherein the deal capture module is further adapted to
transmit data corresponding to the executed trades to a clearing entity.

14. The electronic trading system of claim 13 wherein the deal capture module further comprises an interface to a clearing entity, the deal capture module being adapted to transmit data associated with executed block trades to the clearing entity at the end of a trading period.

15. The electronic trading system of claim 12 wherein each block trading tier additionally specifies a volume range for block orders within that block trading tier and the trading engine is further adapted to
receive a block order for a financial instrument, the block order having a volume size that falls within one of the set of block trading tiers; and
execute the block order against a counter order in accordance with the specified minimum order size for that block trading tier.

16. The electronic trading system of claim 12 wherein the trading device includes a graphical user interface on the trading device, the graphical user interface providing an order entry screen on the trading device.

17. The electronic trading system of claim 16 further comprising:
receiving trading data through the order entry screen, the trading data including a quantity and price of a financial instrument, and data relating to the block trading tiers.

18. The electronic trading system of claim 17 further comprising initially launching the order entry screen on the trading device; and receiving the trading data as user input.

19. The electronic trading system of claim 17 further comprising displaying block trading options on the order entry screen, including the option to remove any trading limits.

20. The electronic trading system of claim 17 further comprising displaying block trading options on the order entry screen, including the option to enter custom trading tiers as the block trading tiers.

21. The electronic trading system of claim 17 further comprising displaying block trading options on the order entry screen, including the option to modify the minimum order size for each block trading tier.

22. The electronic trading system of claim 17 further comprising displaying order information relating to the trading data.

23. The electronic trading system of claim 22 wherein the displayed order information includes at least one code identifying a block trading parameter for the order.

24. In an electronic trading system having a server, a trading engine, and an order book wherein orders are executed on a first-in, first-out priority basis, a method for facilitating block trading of financial instruments comprising:
receiving, at the server from a trading device which interfaces with the server, a block order for a financial instrument, the block order including an instruction to minimize the number of transactions for filling the block order in accordance with a specified minimum order size the specified minimum order size indicating the minimum order size for a counter order for executing block trades of the block order against the counter order;
matching at the trading engine the block order against at least one selected counter order having a volume that is greater than or equal to the minimum order size, wherein said at least one selected counter order has a priority that is lower than an unmatched counter order;
executing at the trading engine the block order against the selected counter order to produce a block trade;
at the server, identifying sets of executed block trades, the executed block trades in a set having matching parties and financial instruments;
at the server, combining the executed block trades in each set of matching executed block trades into a single trading order;
at the server, removing the individual executed matching block trades from the system; and
at the server, executing the single trading order.

25. The method of claim 24 further comprising the step of establishing at the server a plurality of block trading tiers, each block trading tier having a volume range for block orders within the respective block trading tier,
and a minimum order size for counter orders for filling block trades of block orders against the counter orders within the respective block trading tier, wherein the block order has a volume that falls within the volume range of one of the block trading tiers and is executed against a counter order in accordance with the specified minimum order size which is the minimum order size associated with the block trading tier in which the block order falls.

26. The method of claim 25 wherein the block order is received from the trading device, the trading device modifying, in accordance with user input, the volume ranges for the plurality of block trading tiers, so as to modify the block trading tier in which the block orders falls.

27. The method of claim 25 wherein the step of establishing a plurality of block trading tiers for a particular financial instrument comprises analyzing a trading history of the financial instrument and selecting volume ranges and minimum order sizes for the block trading tiers to reduce transaction costs.

28. The method of claim 25 further comprising:
receiving, at the server from a trading device which interfaces with the server, a plurality of block orders for the financial instrument, the block orders having a first-in, first-out execution priority; and
within each block trading tier, executing at the trading engine the associated block orders in accordance with the execution priority, wherein at least one block order steps around a higher priority block order based on the tiered trading ranges.

29. The method of claim 25 further comprising:
receiving, at the server from a trading device which interfaces with the server, a plurality of block orders for the financial instrument, the block orders having a first-in, first-out execution priority; and
executing at the trading engine the associated block orders in accordance with the execution priority, wherein at least one block order steps around a higher priority block order based on block order size.

30. In an electronic trading system having a server and a trading engine, a method for facilitating block trading of financial instruments comprising:
establishing at the server a plurality of block trading tiers, each block trading tier being defined by a volume range for block orders falling within the tier,
receiving, at the server from a trading device which interfaces with the server, a block order for a financial instrument, the block order having a volume size falling within the volume range of one of the plurality of block trading tiers; and
executing, at the trading engine, the block order against a counter order to produce a block trade;
at the server, identifying sets of executed block trades, the executed block trades in a set having matching parties and financial instruments;
at the server, combining the executed block trades in each set of matching executed block trades into a single trading order;
at the server, removing the individual executed matching block trades; and at the server, executing the single trading order.

31. The method of claim 30, wherein each block trading tier additionally specifies a minimum order size for counter orders which may be matched with the block orders falling within the tier to produce an executed block trade, and
the step of executing the block order comprises executing the block order against a counter order having a size greater than or equal to the specified minimum order size for the tier in which the block order falls.

32. The method of claim 30 wherein the received block order includes information specifying, for at least one of the block trading tiers, a minimum order size for counter orders which may be matched with block orders falling within the tier to produce an executed block trade.

33. The method of claim 32 wherein the minimum order size is selected to minimize the number of trades required to fill the block order.

34. The method of claim 32 wherein the block order includes information modifying, for at least one of the block trading tiers, the volume range for block orders falling within that tier.

35. The method of claim 34 wherein the modified volume range is selected to minimize the number of trades required to fill the block order.

* * * * *